United States Patent
Oyama et al.

(10) Patent No.: US 10,850,396 B2
(45) Date of Patent: Dec. 1, 2020

(54) CONTROLLER FOR MONITORING MOVEMENT DIRECTION OF OPERATION TOOL

(71) Applicant: FANUC CORPORATION, Yamanashi (JP)

(72) Inventors: Takumi Oyama, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 81 days.

(21) Appl. No.: 16/131,030

(22) Filed: Sep. 14, 2018

(65) Prior Publication Data

US 2019/0105774 A1   Apr. 11, 2019

(30) Foreign Application Priority Data

Oct. 11, 2017  (JP) .................... 2017-197827

(51) Int. Cl.
*B25J 9/16* (2006.01)
*G05B 19/4061* (2006.01)
*G05B 19/416* (2006.01)

(52) U.S. Cl.
CPC ........ *B25J 9/1666* (2013.01); *G05B 19/4061* (2013.01); *G05B 19/416* (2013.01); *G05B 2219/39088* (2013.01)

(58) Field of Classification Search
CPC .. B25J 9/1666; G05B 19/416; G05B 19/4061; G05B 2219/39088
See application file for complete search history.

(56) References Cited

U.S. PATENT DOCUMENTS

| | | | |
|---|---|---|---|
| 6,269,283 B1* | 7/2001 | Shinozaki | G05B 19/4061 700/172 |
| 2007/0046677 A1* | 3/2007 | Hong | G05B 19/41 345/442 |
| 2007/0213873 A1 | 9/2007 | Ban et al. | |
| 2012/0000891 A1* | 1/2012 | Nakanishi | B23K 11/115 219/86.7 |
| 2016/0332297 A1* | 11/2016 | Sugaya | G06F 3/04842 |

FOREIGN PATENT DOCUMENTS

| | | |
|---|---|---|
| CN | 101888920 A | 11/2010 |
| CN | 106737770 A | 5/2017 |
| DE | 69736055 T2 | 12/2006 |
| DE | 102006055359 A1 | 6/2007 |

(Continued)

*Primary Examiner* — Stephen Holwerda
(74) *Attorney, Agent, or Firm* — Hauptman Ham, LLP

(57) ABSTRACT

A controller includes a storage unit that stores a configuration file in which a tool coordinate system including a coordinate axis extending in the restriction direction of a movement of a hand is set. The controller includes a determination unit that determines whether or not the origin of the tool coordinate system moves in the direction of the coordinate axis extending in the restriction direction. The controller includes a speed limiting unit that limits the motion speed of the robot. The speed limiting unit performs a speed reduction control for reducing the movement speed of the hand or a stop control for stopping the robot if the origin of the tool coordinate system moves in the direction of the coordinate axis extending in the restriction direction.

13 Claims, 14 Drawing Sheets

(56) References Cited

FOREIGN PATENT DOCUMENTS

| | | |
|---|---|---|
| DE | 69936073 T2 | 8/2007 |
| DE | 102007059480 A1 | 6/2009 |
| DE | 102011084412 A1 | 4/2013 |
| DE | 102012012291 A1 | 12/2013 |
| JP | H10-264080 A | 10/1998 |
| JP | 2004-220384 A | 8/2004 |
| JP | 2010-269418 A | 12/2010 |
| JP | 2013-41478 A | 2/2013 |
| JP | 2013-136123 A | 7/2013 |
| JP | 2015-123517 A | 7/2015 |
| JP | 2016-150113 A | 8/2016 |
| JP | 2017-94430 A | 6/2017 |

\* cited by examiner

CONTROLLER FOR MONITORING MOVEMENT DIRECTION OF OPERATION TOOL

RELATED APPLICATIONS

The present application claims priority of Japanese Application Number 2017-197827, filed on Oct. 11, 2017, the disclosure of which is hereby incorporated by reference herein in its entirety.

BACKGROUND OF THE INVENTION

1. Field of the Invention

The present invention relates to a controller for monitoring the movement direction of an operation tool.

2. Description of the Related Art

A robot device includes a robot, an operation tool attached to the robot, and a controller for controlling the robot. The controller drives the robot and the operation tool based on a motion program that is prepared in advance. The controller can have a monitoring function of monitoring the motion of the robot. Specifically, the controller can have the function of monitoring whether or not the robot is driven with a desired motion. For example, when the robot performs motions other than the desired motion, the controller can restrict the motion of the robot (for example, Japanese Unexamined Patent Publication No. 2017-94430A).

SUMMARY OF THE INVENTION

In an operation performed by a robot device, an operation tool is sometimes moved in a desired direction. In other words, the operation tool is not moved in the direction other than the desired direction in some cases. The controller can monitor the motion of the robot driven based on the motion program by using the monitoring function.

In the monitoring of the motion of the robot, an operator can set various coordinate systems so as to perform the controls. In the robot device, the operator can determine a point that is stationary even in the motion of the robot and set a reference coordinate system with the stationary point serving as an origin. The reference coordinate system is set, for example, on the base of the robot. Furthermore, the operator can set an arbitrary coordinate system on a workpiece to be processed. Such a coordinate system is also referred to as a user coordinate system. The user coordinate system can be set by transforming the reference coordinate system.

When the operator sets a restriction direction in which the operation tool should not move, the user coordinate system can be set on a surface of a workpiece fixed on a work table. The operator can determine the restriction direction on the coordinate axes of the user coordinate system. During the motion of the robot, the operation tool is allowed to move in directions other than the restriction direction. When a movement parallel to the restriction direction of the operation tool is detected, the controller can perform control so as to stop the robot.

The controller sometimes monitors the motions in a plurality of operations performed on workpieces. In a method of setting the user coordinate system on the surface of the workpiece, the controller monitors the motions while switching the user coordinate system in each operation. It is necessary that the operator set a plurality of user coordinate systems for a plurality of operations. Moreover, it is necessary that the operator set a user coordinate systems for each point when movement directions are limited on a plurality of points on a workpiece. Thus, the creation of a configuration file requires an extended time period.

An aspect of the present disclosure is a controller for controlling a robot. A reference coordinate system is predetermined for the robot, a flange coordinate system that is transformed from the reference coordinate system with an origin set on a surface of a flange at the tip of the robot where an operation tool is attached is predetermined, and a tool coordinate system that is transformed from the flange coordinate system is predetermined. The controller includes a storage unit that stores a configuration file in which the tool coordinate system is set. The tool coordinate system includes a coordinate axis extending in the restriction direction for restricting a movement of the operation tool. The controller includes a direction calculating unit that calculates the movement direction of the origin of the tool coordinate system based on the tool coordinate system set in the configuration file and the position and posture of the robot. The controller includes a determination unit that determines whether or not the origin of the tool coordinate system moves in the direction of the coordinate axis extending in the restriction direction. The controller includes a speed limiting unit that limits the motion speed of the robot based on a motion program. The speed limiting unit performs a speed reduction control for reducing the movement speed of the operation tool or a stop control for stopping the robot if the origin of the tool coordinate system moves in the direction of the coordinate axis extending in the restriction direction.

Another aspect of the present disclosure is a controller for controlling a robot. A reference coordinate system is predetermined for the robot, a flange coordinate system that is transformed from the reference coordinate system with an origin set on a surface of a flange at the tip of the robot where an operation tool is attached is predetermined, and a tool coordinate system that is transformed from the flange coordinate system is predetermined. The controller includes a storage unit that stores a configuration file in which the tool coordinate system is set. The tool coordinate system includes a coordinate axis extending in a permission direction for permitting a movement of the operation tool. The controller includes a direction calculating unit that calculates the movement direction of the origin of the tool coordinate system based on the tool coordinate system set in the configuration file and the position and posture of the robot. The controller includes a determination unit that determines whether or not the origin of the tool coordinate system moves in the direction of a coordinate axis other than the coordinate axis extending in the permission direction. The controller includes a speed limiting unit that limits the motion speed of the robot based on a motion program. The speed limiting unit performs a speed reduction control for reducing the movement speed of the operation tool or a stop control for stopping the robot if the origin of the tool coordinate system moves in the direction of the coordinate axis other than the coordinate axis extending in the permission direction.

DETAILED DESCRIPTION

Referring to FIGS. 1 to 17, a controller for a robot according to an embodiment will be described below. The controller of the present embodiment monitors the movement of an operation tool in a period during which the robot is driven based on a motion program.

Figure 1:
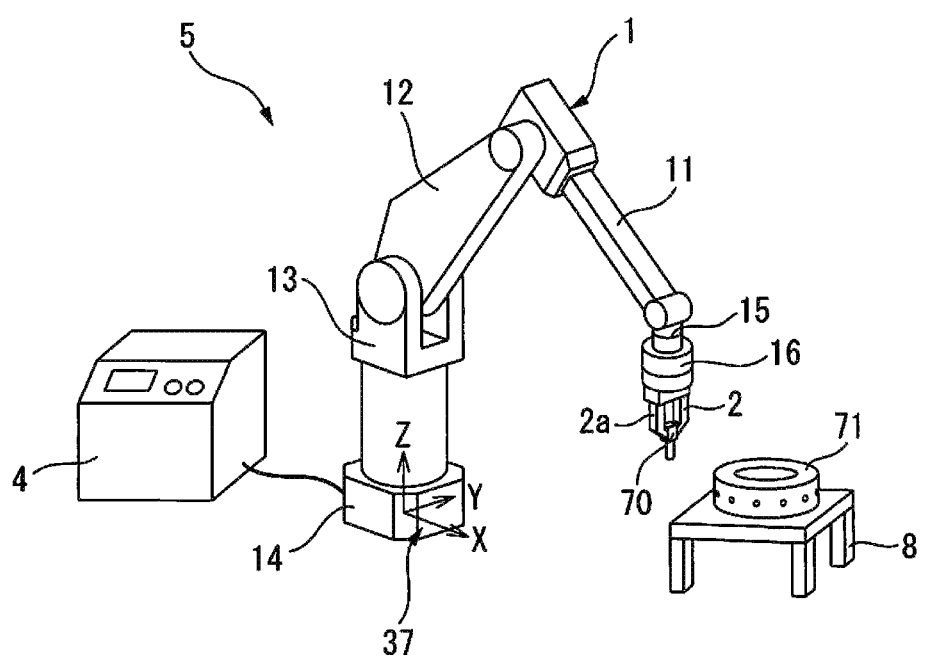
FIG. 1 is a schematic perspective view showing a robot device according to an embodiment.

FIG. 1 is a schematic perspective view showing a robot device according to the present embodiment. A robot device 5 includes a robot 1 and a hand 2. The robot device 5 includes a controller 4 that controls the robot 1 and the hand 2. The robot 1 of the present embodiment is an articulated robot including a plurality of joints. In the articulated robot, the orientations of the arms and wrists are changed at the joints.

The hand 2 is an operation tool that grips and releases a workpiece 70. The operation tool is also called an end effector. The hand 2 is formed so as to open and close claws 2a. The operation tool is not limited to the hand 2, but any tool can be used for an operation performed by the robot device 5. For example, the operation tool may be an operation tool for arc welding, an operation tool for placing sealant on a surface of a workpiece, or the like.

The robot 1 of the present embodiment includes a plurality of arms. The robot 1 includes an upper arm 11 and a lower arm 12. The lower arm 12 is supported by a rotation base 13. The rotation base 13 is supported by a base 14. The robot 1 includes a wrist 15 connected to one end of the upper arm 11. The wrist 15 further includes a flange 16 for attachment of the hand 2. The flange 16 is disposed on the tip of the robot 1. These components are formed so as to rotate about a predetermined rotation axis.

Figure 2:
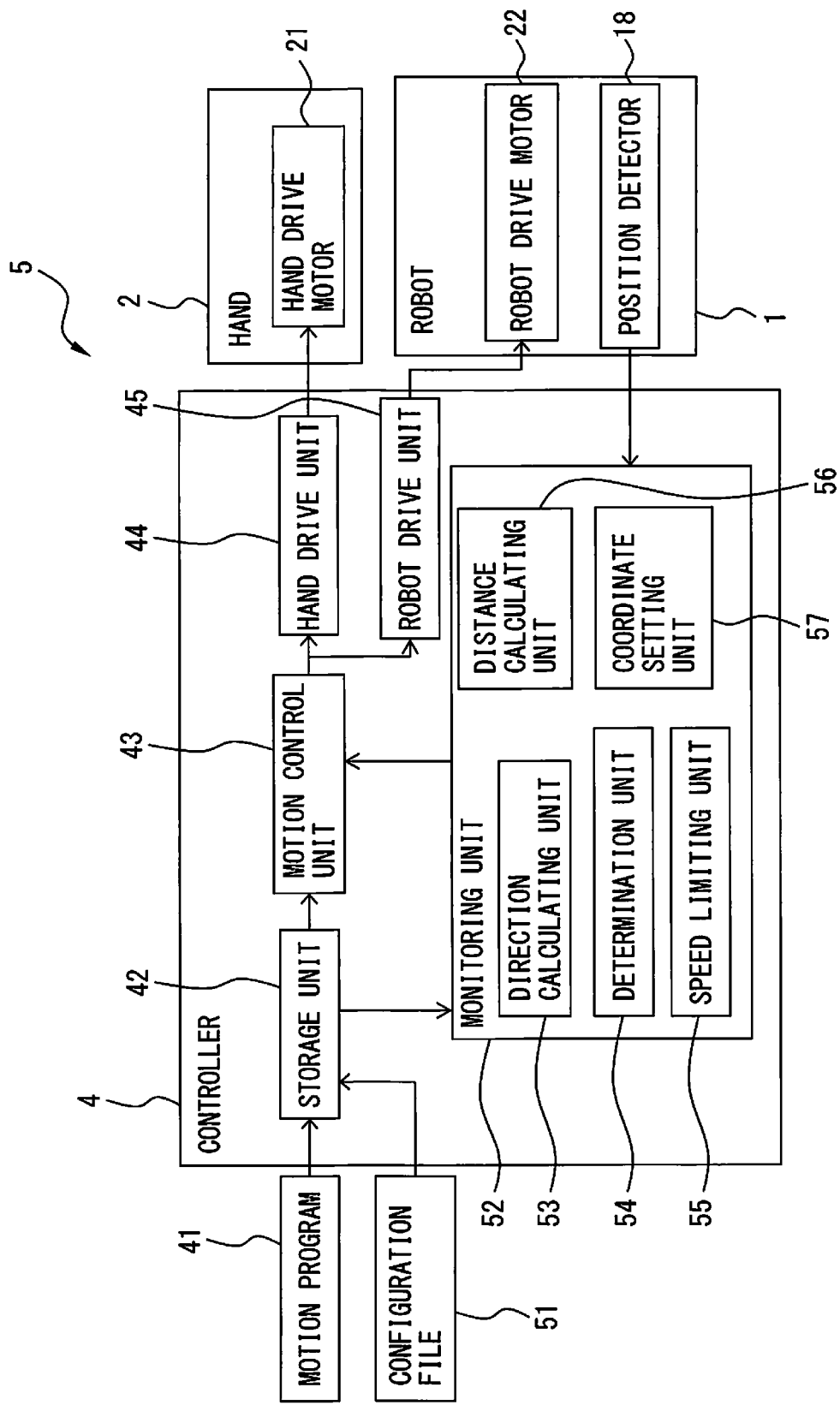
FIG. 2 is a block diagram showing the robot device according to the embodiment.

FIG. 2 is a block diagram showing the robot device according to the present embodiment. Referring to FIGS. 1 and 2, the robot 1 includes a robot drive device that changes the position and posture of the robot 1. The robot drive device drives the components of the robot. The robot drive device includes robot drive motors 22 that drive the components such as the arm and the wrist. In the present embodiment, the robot drive motors 22 corresponding to the respective drive axes are arranged.

The robot drive motors 22 drive so as to change the orientations of the respective components.

The robot device 5 includes a hand drive device that drives the hand 2. The hand drive device includes a hand drive motor 21 that drives the claws 2a of the hand 2. The claws 2a of the hand 2 are opened and closed by driving the hand drive motor 21. The hand may be formed so as to be driven by air pressure. In this case, the hand drive device can include an air pump or the like for supplying compressed air to the hand.

The robot device 5 of the present embodiment transfers the workpiece 70 based on a motion program 41. The robot 1 can automatically transfer the workpiece 70 from an initial position to a target position based on the motion program 41.

The controller 4 is composed of an arithmetic processing unit (computer) including a central processing unit (CPU), random access memory (RAM) and read-only memory (ROM) that are connected to the CPU via a bus, and the like. The motion program 41 generated in advance for the motion of the robot 1 is inputted to the controller 4. The motion program 41 is stored in a storage unit 42. A motion control unit 43 transmits a motion command for driving the robot 1 based on the motion program 41 to a robot drive unit 45. The robot drive unit 45 includes an electric circuit that drives the robot drive motor 22. The robot drive unit 45 supplies electric power to the robot drive motor 22 based on the motion command. The robot drive motor 22 is driven so as to change the position and posture of the robot 1, thereby moving the hand 2.

Moreover, the motion control unit 43 transmits a motion command for driving the hand 2 based on the motion program 41 to a hand drive unit 44. The hand drive unit 44 includes an electric circuit that drives the hand driving motor 21. The hand drive unit 44 supplies electric power to the hand driving motor 21 based on the motion command. The hand driving motor 21 is driven so as to drive the claws 2a of the hand 2. The hand 2 can grip and release the workpiece 70.

The robot 1 includes a status detector that detects the position and posture of the robot 1. The status detector of the present embodiment includes a position detector 18 that is attached to the robot drive motor 22 corresponding to the drive axis of the component such as the arm. The orientation of the component with respect to the drive axes can be acquired by the output of the position detector 18. For example, the position detector 18 detects a rotation angle when the robot drive motor 22 is driven. Moreover, the position detector 18 can calculate the rotation speed of the robot drive motor 22 based on the rotation angle of the robot drive motor 22.

In some cases, it is necessary to control the movement direction in which the operation tool moves to a predetermined direction in an operation of the robot device 5. In particular, it is sometimes necessary that the operation tool be precisely moved in a desired direction. The controller 4 includes a monitoring unit 52 that monitors the motion of the robot 1. The monitoring unit 52 of the present embodiment monitors the movement direction of the hand 2. Specifically, when the hand 2 moves, the monitoring unit 52 monitors whether or not the position and posture of the robot 1 have changed as desired.

Figure 3:
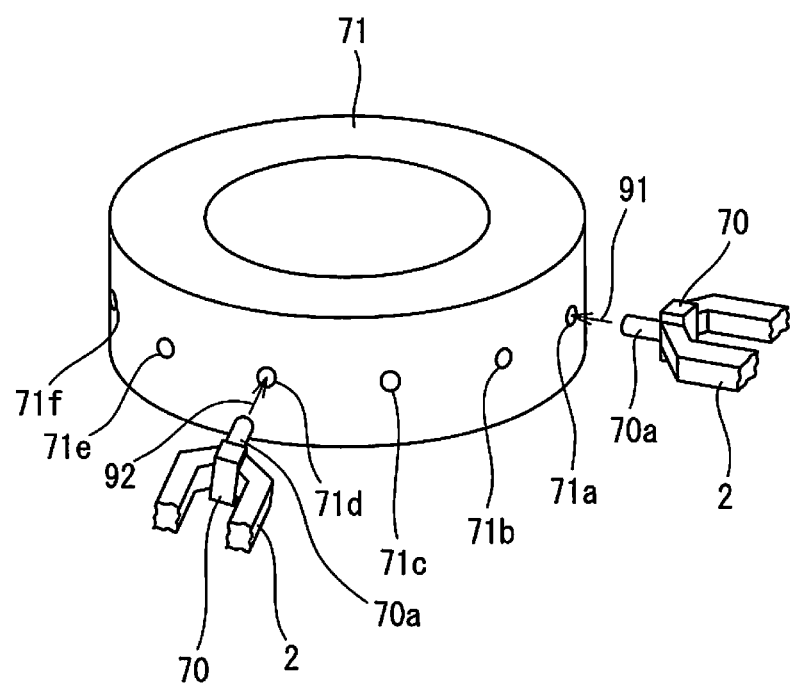
FIG. 3 is a perspective view showing a workpiece fixed on a work table.

FIG. 3 is an enlarged perspective view showing a workpiece fixed on a work table according to the present embodiment. Referring to FIGS. 1 and 3, a workpiece 71 fixed on a work table 8 is annularly shaped. A plurality of holes 71a to 71f are formed on the circumferential surface of the workpiece 71. Rod-shaped portion 70a is formed on the workpiece 70 gripped by the hand 2. As indicated by arrows 91 and 92, the robot device 5 inserts the rod-shaped portions 70a of the workpieces 70 into the holes 71a to 71f of the workpiece 71. In this way, the robot device 5 of the present embodiment performs the operation for attaching the workpieces 70 to the holes 71a to 71f.

The holes 71a to 71f extend to the center of the outer circle of the workpiece 71 in plan view. Thus, the workpieces 70 are inserted into the respective holes 71a to 71f in different directions. It is necessary that the robot device 5 move the workpieces 70 into the holes 71a to 71f in multiple directions. The monitoring unit 52 of the controller 4 monitors whether or not the hand 2 moves along with the direction in which each of the holes 71a to 71f extends.

Referring to FIG. 1, a reference coordinate system 37 that is not moved when the position and posture of the robot 1 are changed is set for the robot device 5. In the example of FIG. 1, the origin of the reference coordinate system 37 is disposed in the base 14 of the robot 1. The reference coordinate system 37 is also referred to as a world coordinate system. The reference coordinate system 37 is a fixed coordinate system even when the position and posture of the robot are changed. In the reference coordinate system 37, the X axis, the Y axis, and the Z axis, which are perpendicular to one another, are set as coordinate axes. Moreover, the W axis is set as a coordinate axis around the X axis. The P axis is set as a coordinate axis around the Y axis. The R axis is set as a coordinate axis around the Z axis. The coordinate values $(x_b, y_b, z_b, w_b, p_b, r_b)$ of the reference coordinate system 37 can be set.

Figure 4:
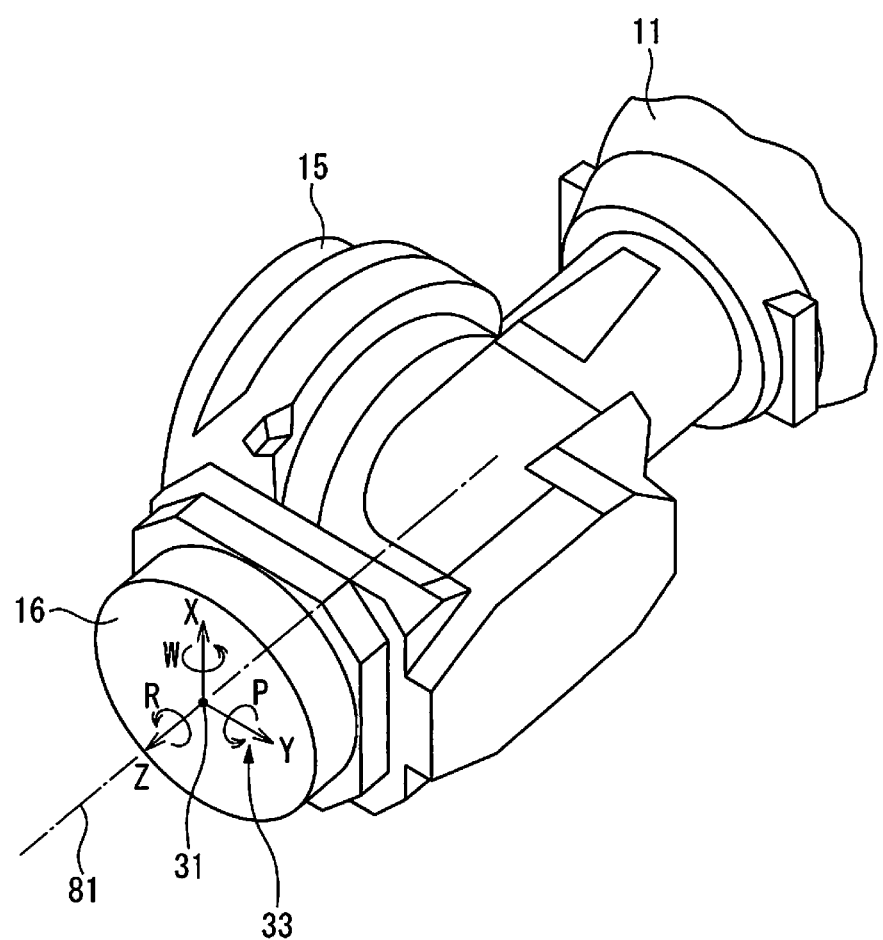
FIG. 4 is a perspective view showing a wrist of the robot according to the embodiment.

FIG. 4 is an enlarged perspective view showing the wrist of the robot according to the present embodiment. The flange 16 is disposed on the tip of the wrist 15. The flange 16 is formed so as to rotate about a rotation axis 81. The hand 2 fixed to the flange 16 rotates about the rotation axis 81. In the surfaces of the flange 16, the flange coordinate system 33 is set on a surface on which the hand 2 is fixed. An origin 31 of the flange coordinate system 33 is set on the rotation axis 81 and on the surface where the hand 2 is fixed. The coordinate axes of the flange coordinate system 33 include the X axis, the Y axis, and the Z axis, which are perpendicular to one another. In the example of FIG. 4, the flange coordinate system 33 is disposed such that the direction in which the rotation axis 81 extends coincides with the direction in which the Z axis extends. Furthermore, the flange coordinate system 33 includes the W axis around the X axis, the P axis around the Y axis, and the R axis around the Z axis. The coordinate values $(x_f, y_f, z_f, w_f, p_f, r_f)$ of the flange coordinate system 33 can be set. In this way, the flange coordinate system 33 includes a plurality of coordinate axes.

The flange coordinate system 33 can be calculated by transforming the reference coordinate system 37. For example, the position of the origin 31 is set by the coordinate value of the X axis, the coordinate value of the Y axis, and the coordinate value of the Z axis of the reference coordinate system 37. The orientation of the flange coordinate system 33 can be set by the coordinate value of the W axis, the coordinate value of the P axis, and the coordinate value of the R axis of the reference coordinate system 37. The flange coordinate system 33 is a coordinate system in which the position of the origin 31 and the orientation are changed when the position and posture of the robot 1 are changed. The flange coordinate system 33 moves according to a motion of the robot 1. The flange coordinate system 33 rotates with, particularly, a surface of the flange 16 during a rotation of the flange 16.

Figure 5:
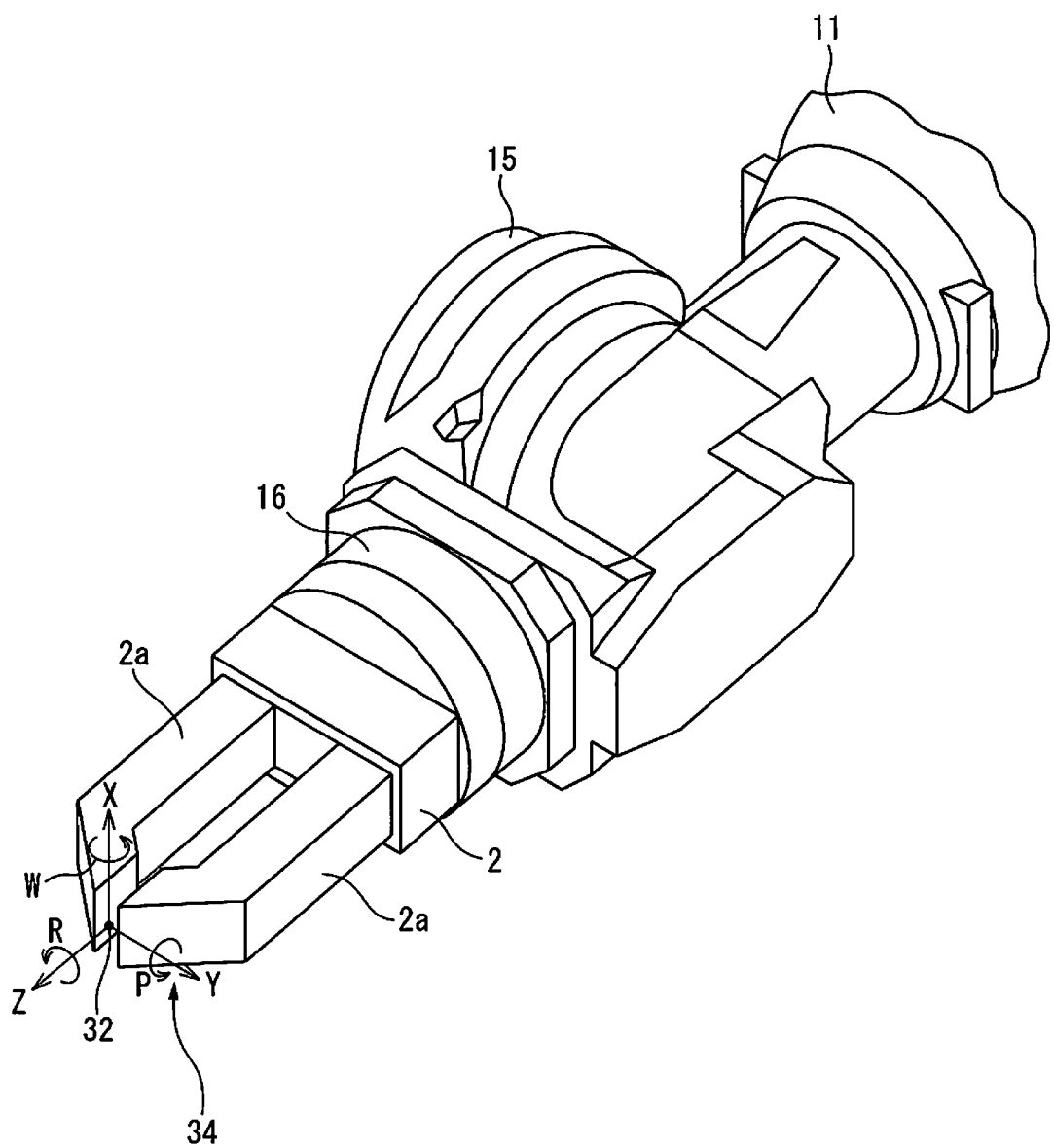
FIG. 5 is a perspective view showing the wrist and hand of the robot according to the embodiment.

FIG. 5 is an enlarged perspective view showing the wrist and the hand of the robot device according to the present embodiment. In the present embodiment, a tool coordinate system 34 is set with an origin 32 at any position on the hand 2. In the example of FIG. 5, the origin 32 is set at a tool center point. The origin 32 of the present embodiment is set at a point where the two claws 2a come into contact with each other when being closed.

The coordinate axes of the tool coordinate system 34 include the X axis, the Y axis, and the Z axis, which are perpendicular to one another. In the example of FIG. 5, the tool coordinate system 34 is disposed such that the direction in which the Z axis extends is parallel to the direction in which the claws 2a extends. Furthermore, the tool coordinate system 34 includes the W axis around the X axis, the P axis around the Y axis, and the R axis around the Z axis. The coordinate values $(x_t, y_t, z_t, w_t, p_t, r_t)$ of the tool coordinate system 34 can be set. In this way, the flange coordinate system 33 includes a plurality of coordinate axes.

The tool coordinate system 34 can be calculated by transforming the flange coordinate system 33. Such transform of the coordinate system is also referred to as coordinate transformation. In the present embodiment, the position of the tool coordinate system 34 relative to the flange coordinate system 33 is determined in advance. For example, the position of the origin 32 of the tool coordinate system 34 is set by the coordinate value of the X axis, the coordinate value of the Y axis, and the coordinate value of the Z axis of the flange coordinate system 33. The orientation of the tool coordinate system 34 can be set by the coordinate value of the W axis, the coordinate value of the P axis, and the coordinate value of the R axis of the flange coordinate system 33. The tool coordinate system 34 is a coordinate system that moves with the hand 2. Moreover, the tool coordinate system 34 of the present embodiment moves with the flange coordinate system 33. When the position and the orientation of the robot 1 are changed, the tool coordinate system 34 moves with the flange coordinate system 33. The monitoring unit 52 of the present embodiment monitors a movement of the hand 2 by using the tool coordinate system 34. In other words, the monitoring unit 52 monitors a motion of the robot 1 by using the tool coordinate system 34.

Referring to FIGS. 2, 3, and 5, a configuration file 51 for monitoring the motion of the robot 1 is inputted to the controller 4. The tool coordinate system 34 is set in advance in the configuration file 51. In the configuration file 51, the coordinate axis in the tool coordinate system 34 is set as restriction direction that restricts the movement of the hand 2 in a specific operation. In the present embodiment, the X axis and the Y axis are set as the restriction directions that restricts the movement of the hand 2. The X axis and the Y axis are coordinate axes extending in the restriction directions. The configuration file 51 is stored in the storage unit 42.

The monitoring unit 52 monitors the movement direction of the hand 2 when the rod-shaped portions 70a of the workpieces 70 are inserted into the holes 71a to 71f of the workpiece 71. In the tool coordinate system 34 of the present embodiment, when the rod-shaped portions 70a are inserted into the holes 71a to 71f, the hand 2 moves in the direction of the Z axis of the tool coordinate system 34.

For example, the motion control unit 43 controls the position and posture of the robot 1 based on the motion program 41 such that the rod-shaped portion 70a is opposed to the hole 71a. The monitoring unit 52 starts a monitor control for monitoring the movement of the hand 2. The motion control unit 43 moves the hand 2 in a direction indicated by arrow 91 based on the motion program 41. The rod-shaped portion 70a is inserted into the hole 71a. The monitoring unit 52 restricts a movement of the hand 2 in the X-axis direction and the Y-axis direction in the tool coordinate system 34. If the hand 2 moves in the X-axis direction or the Y-axis direction, the monitoring unit 52 can determine that the movement direction is different from a desired direction. In other words, the monitoring unit 52 accepts the movement of the hand 2 in the Z-axis direction in the tool coordinate system 34.

If the hand 2 moves in the X-axis direction or the Y-axis direction, the monitoring unit 52 reduces the movement speed of the hand 2 or stop the robot 1. Such monitoring control is continued until the completion of the specific operation. In the present embodiment, the monitoring control is continued until the rod-shaped portion 70a is inserted to a predetermined depth of the hole 71a.

In the present embodiment, the configuration file 51 is inputted from the outside of the controller 4, but the embodiment is not limited to this. The configuration file 51 may be created with a keyboard or the like on the controller 4, and the created configuration file may then be stored in the storage unit 42.

The monitoring unit 52 of the present embodiment includes a direction calculating unit 53 that calculates the movement direction of the origin 32 of the tool coordinate system 34 based on the position and posture of the robot 1. The monitoring unit 52 includes a determination unit 54 that determines whether or not the origin 32 of the tool coordinate system 34 moves in the direction of the coordinate axis extending in the restriction direction. The monitoring unit 52 includes a speed limiting unit 55 that limits the movement speed of the robot 1 based on the motion program 41. If the origin 32 of the tool coordinate system 34 moves in the direction of the coordinate axis extending in the restriction direction, the speed limiting unit 55 performs a speed reduction control for reducing the movement speed of the hand 2 or a stop control for stopping the robot 1.

Figure 6:
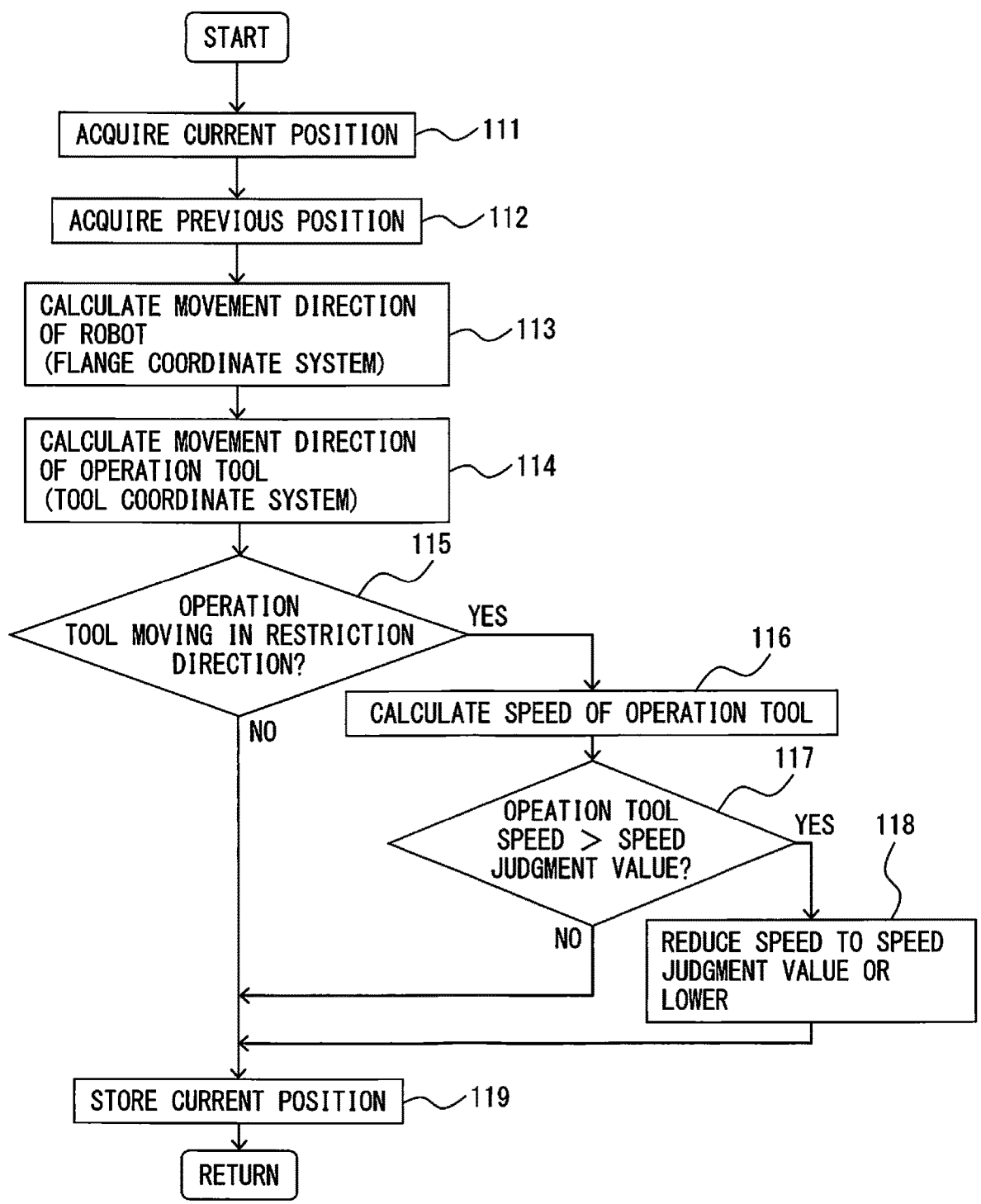
FIG. 6 is a flowchart showing first monitoring control according to the embodiment.

FIG. 6 is a flowchart showing first monitoring control according to the present embodiment. The monitoring control in FIG. 6 can be repeated at predetermined time intervals. The monitoring control can be started when the position and posture of the robot 1 reach a state in which the monitoring is started. Moreover, the monitoring control can be performed until the completion of the movement of the hand 2 to be monitored. In this example, as shown in FIG. 3, the monitoring control can be started when the control for moving the hand 2 in the Z-axis direction of the tool coordinate system 34 is started in order to insert the rod-shaped portion 70a into the hole 71a. Moreover, the monitoring control can be continued until the completion of the movement of the hand 2 in the Z-axis direction.

Referring to FIGS. 2 and 6, in step 111, the direction calculating unit 53 acquires the current position and posture of the robot 1. The direction calculating unit 53 can calculate the position and direction of the origin 31 of the flange coordinate system 33 as the position and posture of the robot 1. The position and posture of the robot 1 can be calculated based on the outputs of the position detectors 18 attached to the robot drive motors 22.

In step 112, the direction calculating unit 53 acquires the position of the origin 31 of the flange coordinate system 33 in the previous control. In step 113, the direction calculating unit 53 calculates the movement direction of the robot 1. In this case, the movement direction of the origin 31 of the flange coordinate system 33 can be calculated as the movement direction of the robot 1. The movement direction can be expressed as a vector. The direction calculating unit 53 can calculate a direction from a past position to a current position.

Thereafter, in step 114, the direction calculating unit 53 calculates the movement direction of the hand 2 serving as the operation tool. The direction calculating unit 53 acquires the set value of the tool coordinate system 34 from the configuration file 51. The direction calculating unit 53 calculates the movement direction of the origin 32 of the tool coordinate system 34 based on the movement direction of the origin 31 of the flange coordinate system 33. The movement direction of the origin 32 of the tool coordinate system 34 corresponds to the movement direction of the hand 2. In this way, the direction calculating unit 53 calculates the movement direction of the operation tool in a small section that corresponds to a time interval for repeating the control.

Subsequently, in step 115, the determination unit 54 determines whether or not the origin 32 of the tool coordinate system 34 moves in the directions of the coordinate axes extending in the restriction directions. In other words, the determination unit 54 determines whether or not the movement direction of the operation tool includes the components of the restriction directions. The determination unit 54 acquires the configuration file 51 from the storage unit 42. In the determination of the present embodiment, the directions for determination are the X-axis direction, the Y-axis direction, and the Z-axis direction of the tool coordinate system 34. In the configuration file 51, the X-axis direction and the Y-axis direction are set as the restriction directions.

The determination unit 54 determines whether or not the movement direction calculated in step 114 includes at least one of an X-axis component and a Y-axis component. If the movement direction calculated in step 114 includes at least one of the X-axis component and the Y-axis component, the determination unit 54 can determine that the hand 2 is moving in a direction other than the Z-axis direction. The determination unit 54 can determine that the hand 2 is moving in the restriction direction. In this case, the control advances to step 116.

In step 116, the determination unit 54 calculates the movement speed of the hand 2. The movement speed of the hand 2 can be calculated based on the position of the origin 32 of the tool coordinate system 34 in the previous control, the position of the origin 32 of the tool coordinate system 34 in the current control, and the time interval for control. The movement speed of the hand 2 can be calculated by dividing the movement distance of the origin 32 of the tool coordinate system 34 by a control period.

Subsequently, in step 117, the determination unit 54 determines whether or not the movement speed of the hand 2 is higher than a speed judgment value. The speed judgment value can be set in advance according to the operation performed by the robot device 5. For example, if the hole 71a is substantially as large as the rod-shaped portions 70a, the operation is preferably performed at low speed. In this case, the speed judgment value can be set at a low value. The speed judgment value of the operation tool can be set in advance in the configuration file 51.

In step 117, if the movement speed of the hand 2 is not higher than the speed judgment value, it can be determined that the movement speed of the hand 2 based on the motion program 41 is sufficiently low. In this case, the movement speed of the hand 2 is maintained. Then, the control advances to step 119. In step 119, the current position and posture of the robot 1 are stored in the storage unit 42.

In step 117, if the movement speed of the hand 2 is higher than the speed judgment value, the control advances to step 118. In step 118, the speed limiting unit 55 transmits a command for reducing the motion speed of the robot 1 to the motion control unit 43 such that the movement speed of the hand 2 decreases to the speed judgment value or lower. The motion control unit 43 controls the robot drive motor 22 such that the movement speed of the hand 2 decreases to the speed judgment value or lower. For example, the motion control unit 43 can perform the control for reducing the speed to the speed judgment value. By performing such speed reduction control, the motion error of the robot 1 can be reduced. Thus, a desired operation can be completed even if the movement direction of the hand 2 is slightly displaced from the desired direction. Thereafter, the control advances to step 119 so as to store the current position and posture of the robot 1.

As described above, in the monitoring control of the present embodiment, a motion of the robot can be monitored based on the tool coordinate system. The operator need only input, to the configuration file, the restriction direction (coordinate axis) for restricting the movement in the tool coordinate system, whereby the setting for monitoring can be facilitated.

Figure 7:
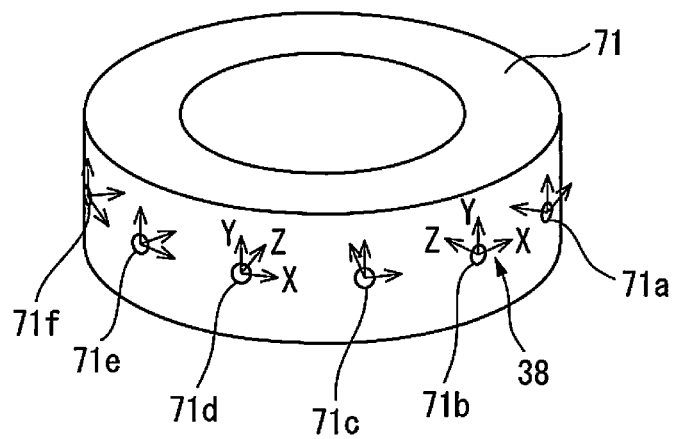
FIG. 7 is an explanatory drawing showing a user coordinate system set for the workpiece in a comparative example.

FIG. 7 is a perspective view showing a workpiece for illustrating a user coordinate system in a comparative example. In the comparative example, a user coordinate system 38 for monitoring the movement direction of the hand 2 is set for each of the holes 71a to 71f. For example, the user coordinate system is set for each of the holes such that the holes 71a to 71f extend in the Z-axis direction. The user coordinate system 38 can be set based on the reference coordinate system. The controller monitors the movement direction of the operation tool based on the user coordinate system 38.

In the example of FIG. 7, the six holes 71a to 71f are formed whereby it is necessary for the operator to set the six user coordinate systems 38 in the configuration file. Moreover, it is necessary that the restriction directions (the X-axis direction and the Y-axis direction) are set in the respective user coordinate systems 38. Thus, the creation of the configuration file requires an extended time period.

In contrast, in the monitoring control of the present embodiment, the tool coordinate system 34 is used for monitoring and thus only the single tool coordinate system is necessary for the configuration file 51. Furthermore, it is necessary to set only the coordinate axis of the single tool coordinate system as restriction direction of movement. Thus, the operator can easily create the configuration file. Moreover, setting errors can be suppressed in the creation of the configuration file.

Referring to FIG. 6, in the first monitoring control of the present embodiment, if the movement speed of the operation tool is higher than the speed judgment value in step 116 and step 117, the movement speed of the operation tool is controlled to a lower speed. If the operation tool moves at low speed based on the motion program 41, this control can avoid a further reduction in the movement speed of the operation tool. The movement speed of the operation tool is not reduced to the extent that the extension of the operation time is suppressed.

Note that, the speed reduction control may be performed so as to reduce the movement speed of the operation tool without determination regarding the movement speed of the operation tool. Specifically, in step 115, if the movement direction of the operation tool includes the component of the coordinate axis extending in the restriction direction, the movement speed of the operation tool may be controlled to a lower speed. In this case, for example, a reduction amount in the movement speed of the operation tool can be set in advance. The speed limiting unit 55 can reduce a current speed by the predetermined reduction amount.

Alternatively, instead of the speed reduction control, the speed limiting unit 55 may control the movement speed of the operation tool to 0. In other words, the speed limiting unit 55 may perform a stop control so as to stop the robot 1.

In the present embodiment, the X-axis direction and the Y-axis direction are set as the restriction directions, but the embodiment is not limited to this. Any direction may be set as the restriction direction. For example, the restriction direction may be set at the single coordinate axis.

In the present embodiment, the control for fitting the workpiece 70 into the other workpiece 71 fixed on the work table 8 is illustrated, but the embodiment is not limited to this. The present invention is applicable to monitoring when the operation tool is moved in the desired direction. For example, the present invention is applicable to the control for monitoring an operation for placing a workpiece into a narrow space of another workpiece, an operation for linearly placing sealant, arc welding, or the like.

Figure 8:
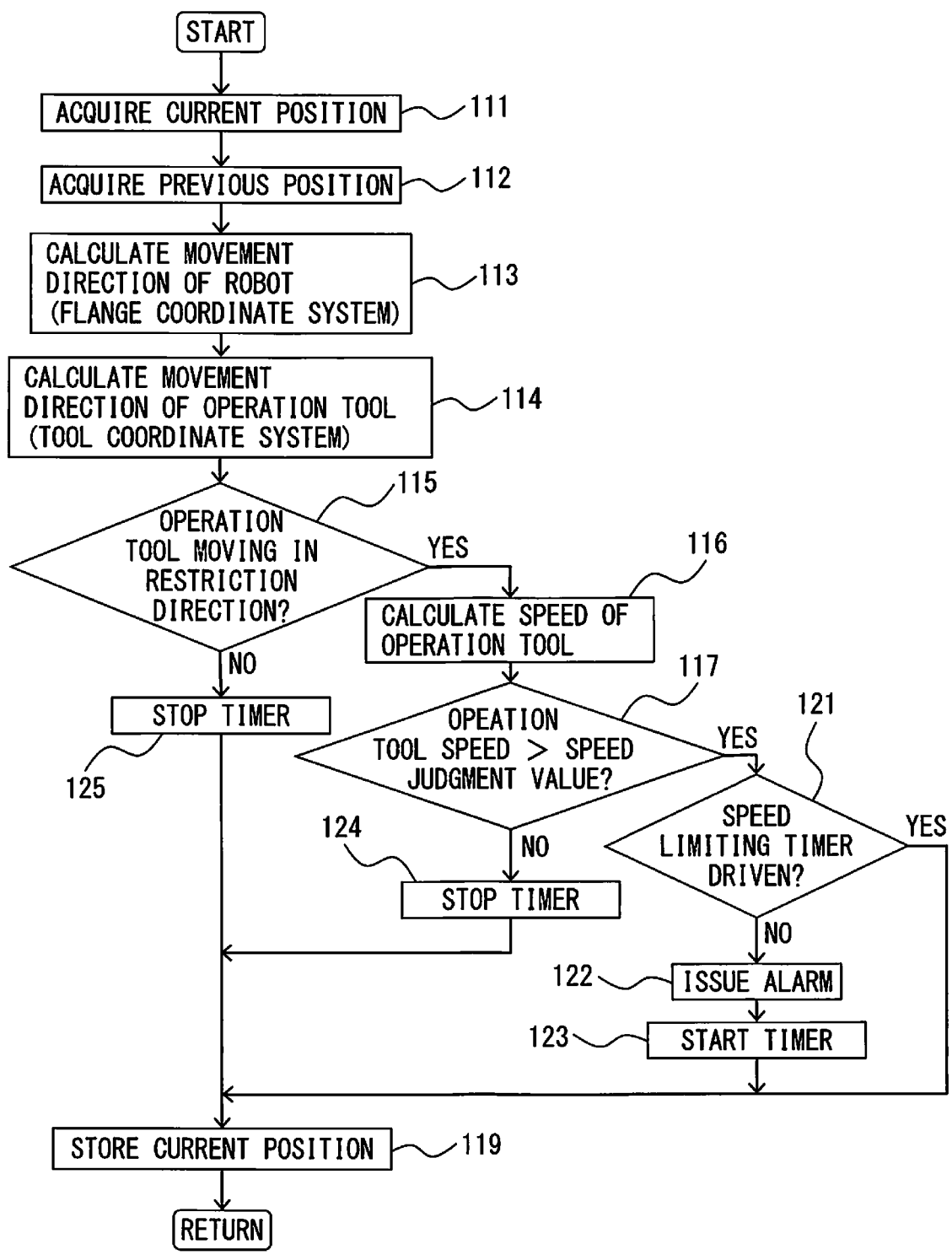
FIG. 8 is a first flowchart showing second monitoring control according to the embodiment.

FIG. 8 is a first flowchart showing second monitoring control according to the present embodiment. When the speed reduction control is performed under the monitoring control, some speed reduction methods are undesirable among the methods in which the speed is reduced. For example, when two workpieces are connected by arc welding, the operation tool moves while performing arc welding on the workpieces. At this point, if the seed of the operation tool is reduced rapidly, the quality of welding may be deteriorated.

For example, a welding mark may expand. Alternatively, if sealant is linearly applied, a rapid decrease in the movement speed of the operation tool may coagulate the sealant. Also in the stop control for stopping the robot, current supplied to the robot drive motor is instantly cut off to stop the robot. In other words, the movement speed rapidly decreases. Thus, speed reduction or stoppage in the monitoring control may adversely affect the operation performed by the robot device.

Referring to FIGS. 2 and 8, in the second monitoring control of the present embodiment, if the determination unit 54 determines that the origin 32 of the tool coordinate system 34 moves in the direction of the coordinate axis extending in the restriction direction, the speed limiting unit 55 continues a current motion during a predetermined set time. In other words, if the determination unit 54 determines that the movement speed of the operation tool is to be limited, the speed limiting unit 55 continues the current motion during the predetermined set time. After the lapse of the set time, the speed limiting unit 55 performs the speed reduction control or the stop control.

The control in FIG. 8 can be repeated at predetermined time intervals. In FIG. 8, steps 111 to 117 and step 119 are similar to those of the first control shown in FIG. 6. In step 117, if the movement speed of the operation tool is higher than the speed judgment value, the control advances to step 121. The speed limiting unit 55 has the function of measuring an elapsed time from a predetermined time. In other words, the speed limiting unit 55 acts as a timer for limiting a speed.

In step 121, the speed limiting unit 55 determines whether or not the timer is driven. In step 121, if the timer is not driven, the control advances to step 122. In step 122, the speed limiting unit 55 issues an alarm to other devices. For example, the speed limiting unit 55 issues an alarm to a display unit disposed on the controller 4. The display unit can display a warning that the direction of the operation tool has deviated from the desired direction. As will be discussed later, the speed limiting unit 55 can send an alarm to the motion control unit 43.

In step 123, the speed limiting unit 55 starts the timer. The control then advances to step 119. If the timer has been started in step 121, the control advances to step 119. In step 119, the storage unit 42 stores the current position and posture of the robot 1.

In step 115, if the operation tool does not move in the restriction direction, the control advances to step 125. In step 117, if the movement speed of the operation tool is not higher than the speed judgment value, the control advances to step 124. In steps 124 and 125, the speed limiting unit 55 stops the timer. If the timer is not started, the speed limiting unit 55 maintains the stopped state of the timer.

Figure 9:
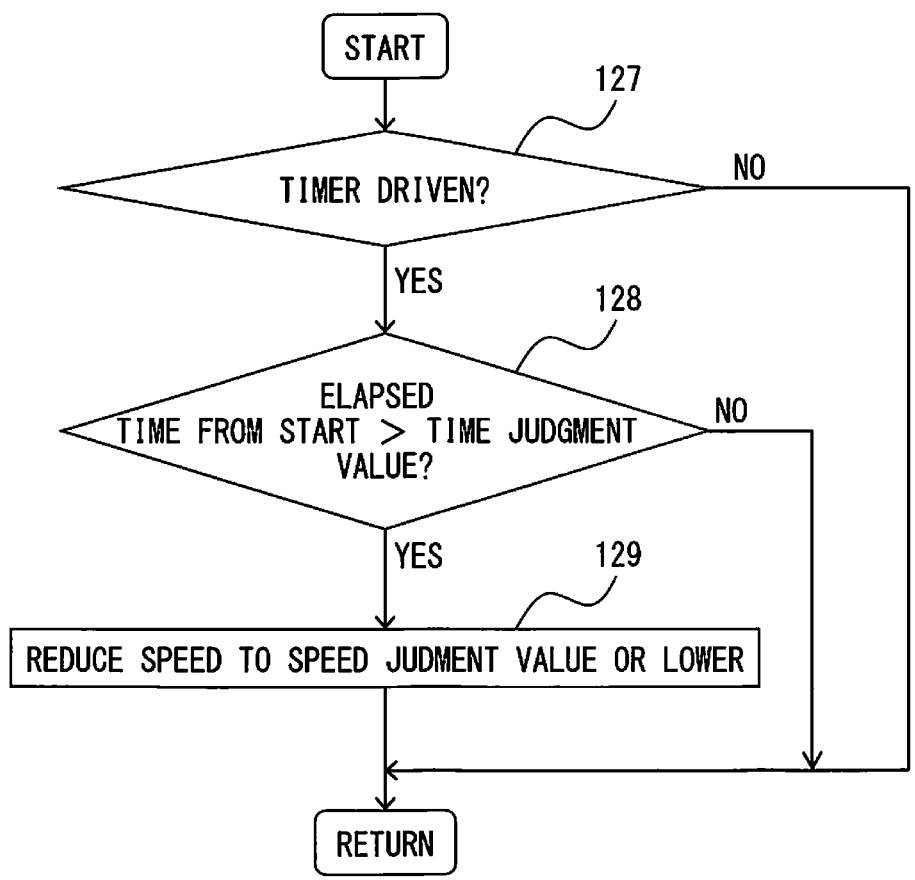
FIG. 9 is a second flowchart showing second monitoring control according to the embodiment.

FIG. 9 is a second flowchart showing the second monitoring control according to the present embodiment. The control of FIG. 9 can be performed concurrently with the control of FIG. 8. Alternatively, the control of FIG. 9 can be performed subsequent to the control of FIG. 8. Referring to FIGS. 2 and 9, in step 127, the determination unit 54 determines whether or not the timer is driven. In step 127, if the timer is not driven, the control is terminated. In step 127, if the timer is driven, the control advances to step 128.

In step 128, the determination unit 54 calculates an elapsed time from the start of the timer. In other words, the determination unit 54 calculates the elapsed time from the determination that the movement speed of the hand 2 is to be limited. The determination unit 54 determines whether or not the elapsed time from the start of the timer is greater than a predetermined time judgment value. In step 128, if the elapsed time from the start of the timer is not greater than the time judgment value, the control is terminated. In step 128, if the elapsed time from the start of the timer is greater than the time judgment value, the desired time has elapsed from the start time for limiting the speed. In this case, the control advances to step 129.

In step 129, the speed limiting unit 55 transmits a command to the motion control unit 43 so as to reduce the movement speed of the operation tool to the speed judgment value or lower. In this way, the monitoring unit 52 measures the elapsed time from the issuance of a signal that the speed is to be limited. The speed limiting unit 55 limits the speed after the predetermined set time has elapsed.

In the second monitoring control, a predetermined extended time is set in the case where the movement speed of the operation tool is reduced at least to the speed judgment value. During the extended time, the controller 4 can perform any control.

For example, in the motion program 41, a method of reducing the motion speed of the robot 1 or a method of stopping the robot 1 can be predetermined in preparation for reception of a signal that reduces the movement speed of the hand 2 or stops the robot 1. The motion program 41 can be set so as to gradually stop the robot 1 or gradually reduce the movement speed of the robot 1.

In step 117 of FIG. 8, if the determination unit 54 determines that the movement speed of the operation tool is higher than the speed judgment value, the monitoring unit 52 in step 122 can transmit a signal in a speed-limiting state to the motion control unit 43. The motion control unit 43 can gradually reduce the movement speed of the hand 2 based on the motion program 41. Alternatively, the motion control unit 43 can gradually slow down the robot 1 in order to stop the robot 1. As a result, the control for stopping the robot 1 instantly or reducing the speed of the robot 1 rapidly can be avoided, whereby a deterioration in the quality of the operation performed by the robot device 5 can be suppressed. The other controls are similar to the first monitoring control.

Figure 10:
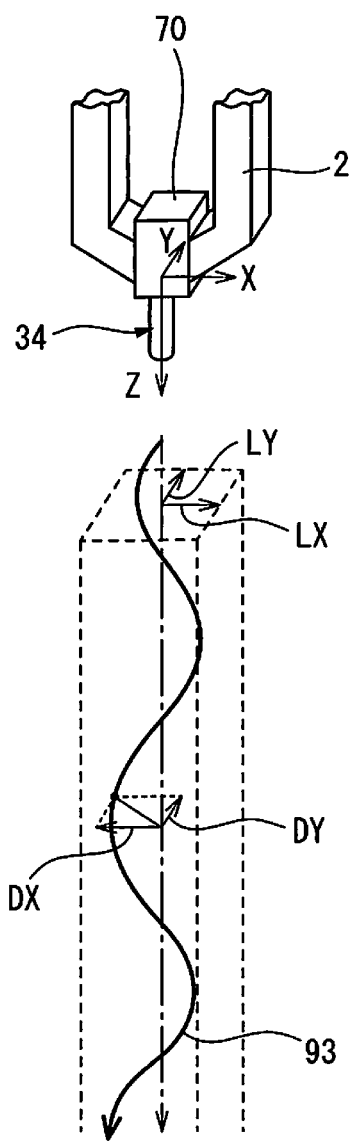
FIG. 10 is a schematic drawing showing the hand and the workpiece in third monitoring control according to the embodiment.

Third control of the present embodiment will be described below. FIG. 10 is a perspective view showing the hand and workpiece in the third monitoring control according to the present embodiment. As described above, in the monitoring control of the present embodiment, it is monitored whether or not the hand 2 moves in the Z-axis direction of the tool coordinate system 34. In other words, in the presence of the speed component in the X-axis direction or the Y-axis direction that serves as a restriction direction, the movement speed of the hand 2 is limited.

The robot 1 of the present embodiment is an articulated robot. In order to move the hand 2 in the Z-axis direction of the tool coordinate system 34, a plurality of the drive shafts are sometimes driven simultaneously. In other words, in some cases, the orientations of the arm and the wrist are changed at the joints so as to linearly move the hand 2. The plurality of the drive shafts are driven simultaneously, whereby the hand 2 may slightly swing in the direction other than the Z-axis direction of the tool coordinate system 34 as indicated by arrow 93. Even in such small swings, the speed limiting unit 55 limits the movement speed of the hand 2 in response to the detection of a movement in the X-axis direction or the Y-axis direction. Thus, in the third monitoring control, even when the movement of the hand 2 is detected in the restriction direction, the movement speed of the hand 2 moved for small distances is controlled without being limited.

Figure 11:
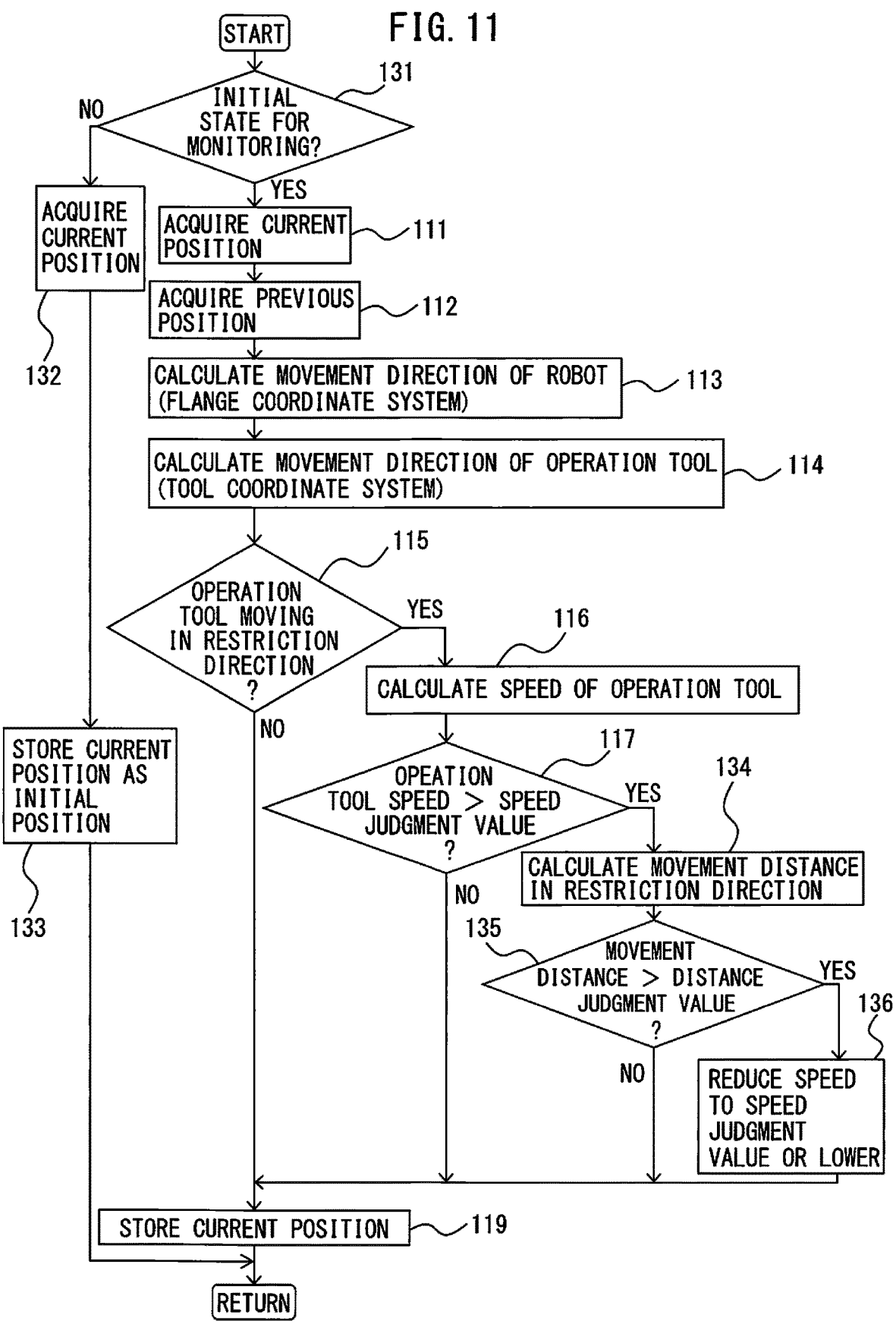
FIG. 11 is a flowchart showing the third monitoring control according to the embodiment.

FIG. 11 is a flowchart showing the third control according to the present embodiment. The control of FIG. 11 can be repeated at predetermined time intervals. Referring to FIGS. 2, 10, and 11, in step 131, the determination unit 54 determines whether or not the position and posture of the robot 1 are placed in a state where the movement of the operation tool is monitored. Referring to FIG. 3, for example, the determination unit 54 determines whether or not the position and posture of the robot 1 are changed to an initial state in which the hand 2 moves in the Z-axis direction of the tool coordinate system 34 (a state where the tips of the rod-shaped portion 70a is opposed to one of the holes 71a to 71f). If the movement of the hand 2 is not to be monitored, the control advances to step 132. In step 132, the direction calculating unit 53 acquires the position of the origin 32 of the tool coordinate system 34 and the orientation of the tool coordinate system 34 based on the current position and posture of the robot 1. In step 133, the storage unit 42 stores the position of the origin 32 of the tool coordinate system 34 and the orientation of the tool coordinate system 34 as an initial position and an initial orientation.

The steps 131 to 133 are continued until a state in which the movement of the operation tool is to be monitored is achieved. The steps 131 to 133 are repeated in a period during which the movement of the operation tool is not monitored, thereby overwriting the initial position of the tool coordinate system 34. The initial position of the tool coordinate system 34 is used when the movement distance in the restriction direction is calculated in the subsequent step. Moreover, the initial position of the tool coordinate system 34 serves as the reference position of the origin 32 of the tool coordinate system 34 before the movement of the operation tool is monitored.

In step 131, if the condition in which the movement of the operation tool is monitored is achieved, the control advances to step 111. Steps 111 to 117 are similar to those of the first monitoring control according to the present embodiment (see FIG. 6). In step 117, if the movement speed of the operation tool is higher than the speed judgment value, the control advances to step 134.

The monitoring unit 52 of the present embodiment includes a distance calculating unit 56 that calculates the movement distance on the coordinate axis extending in the restriction direction. In step 134, the distance calculating unit 56 acquires the initial position of the origin 32 of the tool coordinate system 34 before the monitoring of the operation tool is started. The distance calculating unit 56 acquires the initial position stored in step 133. The distance calculating unit 56 then calculates the movement distance on the coordinate axis extending in the restriction direction.

For example, the distance calculating unit 56 calculates a movement distance DX in the X-axis direction and a movement distance DY in the Y-axis direction. The movement distance DX can be calculated by the difference between the coordinate value of the X-axis at the initial position and the coordinate value of the X-axis at the current position. Similarly, the movement distance DY in the Y-axis direction can be calculated by the similar method.

Subsequently, in step 135, the determination unit 54 determines whether or not the movement distance on the coordinate axis to be monitored is larger than the predetermined distance judgment value. The distance judgment value can be determined in advance and set in the configuration file 51 by an operator. The speed judgment value can be set for each of the coordinate axes to be monitored. In the example of FIG. 10, the determination unit 54 determines whether or not the movement distance DX in the X-axis direction is larger than a distance judgment value LX. Moreover, the determination unit 54 determines whether or not the movement distance DY in the Y-axis direction is larger than a distance judgment value LY. In the case where multiple restriction directions are set, when the movement distance at least on one coordinate axis exceeds the distance judgment value, the determination unit 54 can determine that the movement distance exceeds the distance judgment value in step 135.

In step 135, if the movement distance is not larger than the distance judgment value, the control advances to step 119. In this case, the movement distance in the restriction direction is small and thus the control for limiting the speed is not performed. The motion control unit 43 continues the current motion of the robot 1. In step 135, if the movement distance exceeds the distance judgment value, the control advances to step 136. In step 136, the speed limiting unit 55 controls the movement speed of the operation tool to the speed judgment value or lower.

By performing the third monitoring control, the control for limiting the movement speed of the operation tool can be avoided in the case in which the movement in the restriction direction is small. In the case in which a small swing is caused by the driving the plurality of drive shafts, a reduction in the movement speed of the operation tool or the stoppage of the operation tool can be avoided. The other controls are similar to the first monitoring control of the present embodiment.

A method of setting the tool coordinate system according to the present embodiment will be described below. As described above, in the present embodiment, the operator can set the tool coordinate system 34 in the configuration file 51. Moreover, the operator can set the coordinate axis that corresponds to the restriction direction in the tool coordinate system 34. The controller 4 of the present embodiment has the function of easily setting the tool coordinate system and the restriction direction.

Referring to FIG. 2, the monitoring unit 52 of the present embodiment includes a coordinate setting unit 57 that sets the tool coordinate system 34 in the configuration file. The coordinate setting unit 57 sets the restriction direction for limiting the movement of the operation tool, based on the coordinate values of two measurement points on the operation tool. The coordinate setting unit 57 sets the direction of the coordinate axis based on the restriction direction and sets the tool coordinate system based on the direction of the coordinate axis.

Figure 12:
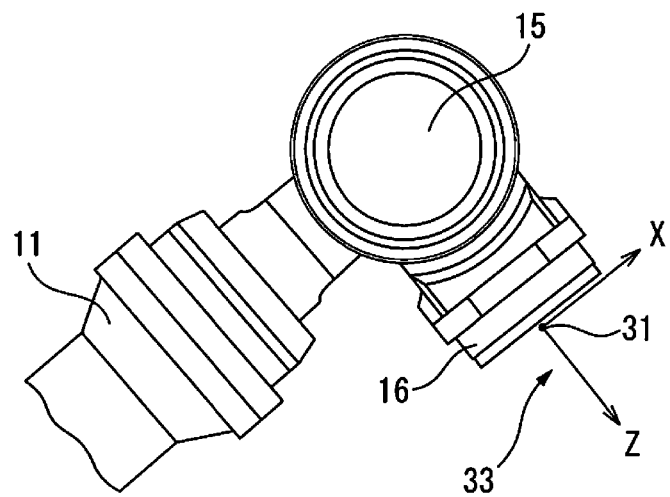
FIG. 12 is a side view showing the wrist of the robot according to the embodiment.
Figure 13:
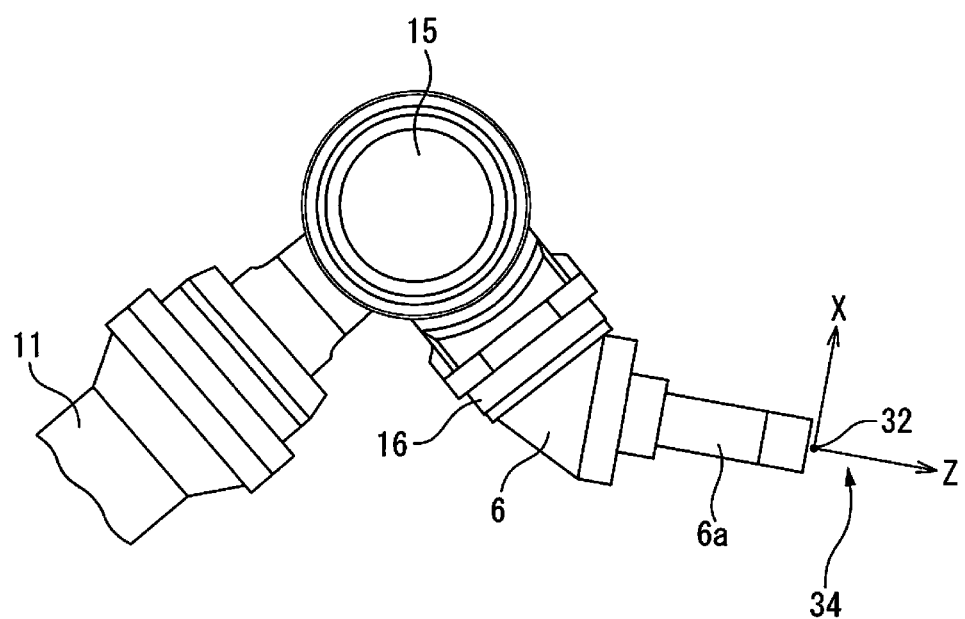
FIG. 13 is a side view showing the wrist and hand of the robot according to the embodiment.

FIG. 12 is a side view showing the wrist of the robot according to the present embodiment. The flange coordinate system 33 having the origin 31 is set on the surface of the flange 16 of the wrist 15. FIG. 13 is a side view showing the wrist of the robot and the hand according to the present embodiment. In the example of FIG. 13, the hand 6 is disposed as the operation tool. The hand 6 is formed such that the claws 6a extend in a direction displaced from the direction of the rotation axis of the flange 16. Also for the hand 6, the tool coordinate system 34 can be set with the origin 32 placed on the hand 6.

Figure 14:
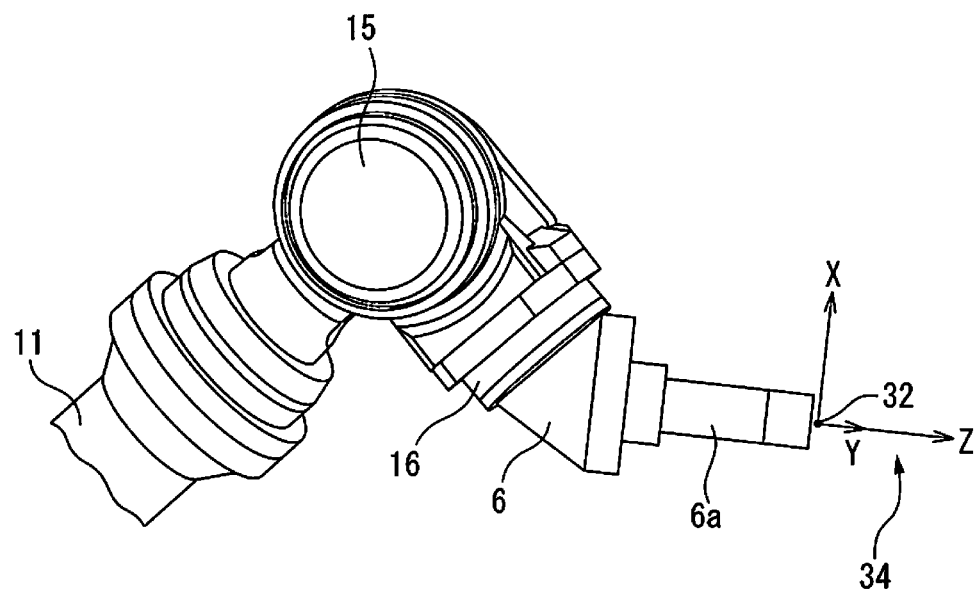
FIG. 14 is a perspective view showing the wrist and the hand of the robot according to the embodiment.

FIG. 14 is another perspective view showing the wrist and the hand according to the present embodiment. In the example of FIG. 14, the perspective view shows that the hand 6 is fixed to the flange 16 while being rotated by 30° about the X axis (in the W-axis direction) of the flange coordinate system 33. A comparison between FIG. 13 and FIG. 14 indicates that the Y-axis direction and the Z-axis direction are changed but the X-axis direction is not changed. In this way, the directions of the coordinate axes of the tool coordinate system needs to be specified in order to determine the restriction direction. The tool coordinate system of the present embodiment has six degrees of freedom. It is only necessary that directions are set for two of the coordinate axes. Furthermore, the position of the origin 32 of the tool coordinate system 34 (the coordinate value of the X axis, the coordinate value of the Y axis, and the coordinate value of the Z axis in the flange coordinate system) can be optionally set.

Figure 15:
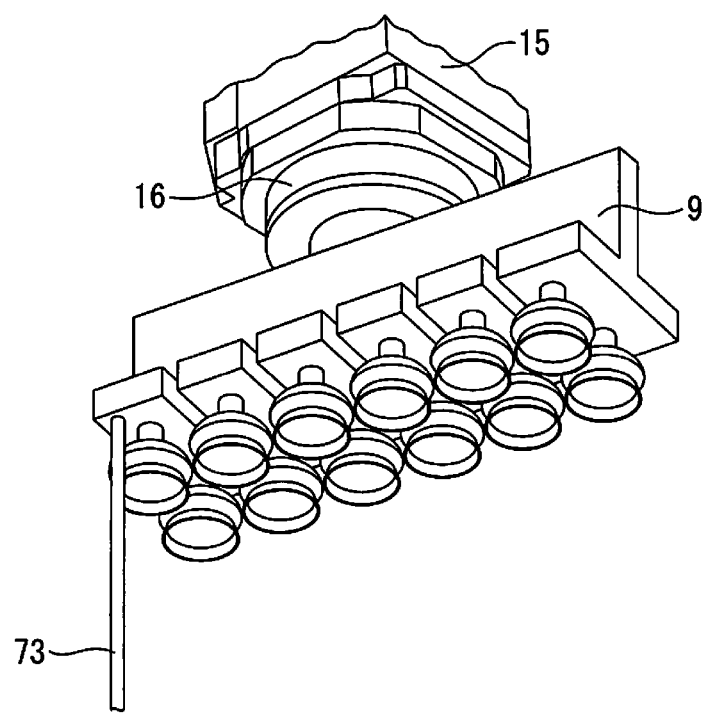
FIG. 15 is a first perspective view showing another hand and a contact bar according to the embodiment.

FIG. 15 is a first perspective view that shows a hand to explain the control for setting the restriction direction of a movement of the hand. A hand 9 shown in the FIG. 15 grips a workpiece by suction. A contact bar 73 is fixed to, for example, a ground surface. The contact bar 73 is fixed even when the position and posture of the robot 1 are changed.

In order to set the direction for restricting the movement of the hand, the operator changes the position and posture of the robot by using a teach pendant. In other words, the position and posture of the robot 1 are manually adjusted. The operator brings the contact bar 73 into contact with a predetermined measurement point on the hand 9. At this point, the coordinate setting unit 57 acquires the position and posture of the robot 1. For example, the coordinate setting unit 57 acquires the position of the origin 31 of the flange coordinate system 33 and the orientation of the flange coordinate system 33. The storage unit 42 stores the position and posture of the robot 1.

Figure 16:
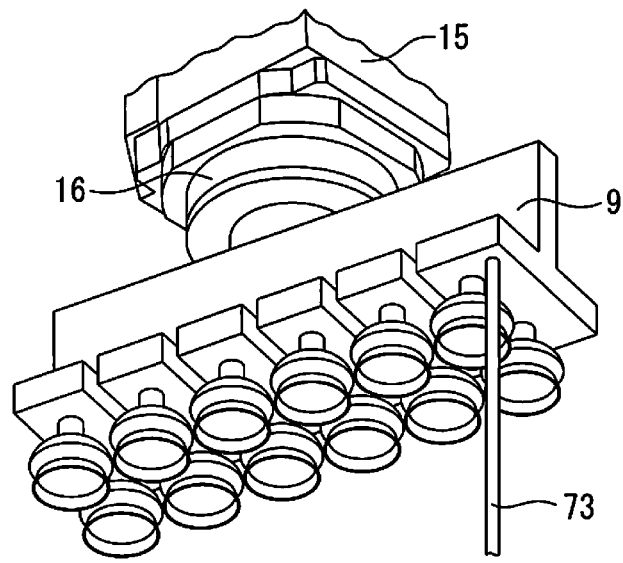
FIG. 16 is a second perspective view showing another hand and the contact bar according to the embodiment.

FIG. 16 is a second perspective view that shows the hand for explaining the control for setting the restriction direction of a movement of the hand. The operator then controls the position and posture of the robot 1 so as to bring the contact bar 73 into contact with another predetermined measurement point on the hand 9. At this point, the coordinate setting unit 57 acquires the position and posture of the robot 1. The storage unit 42 stores the position and posture of the robot 1.

Figure 17:
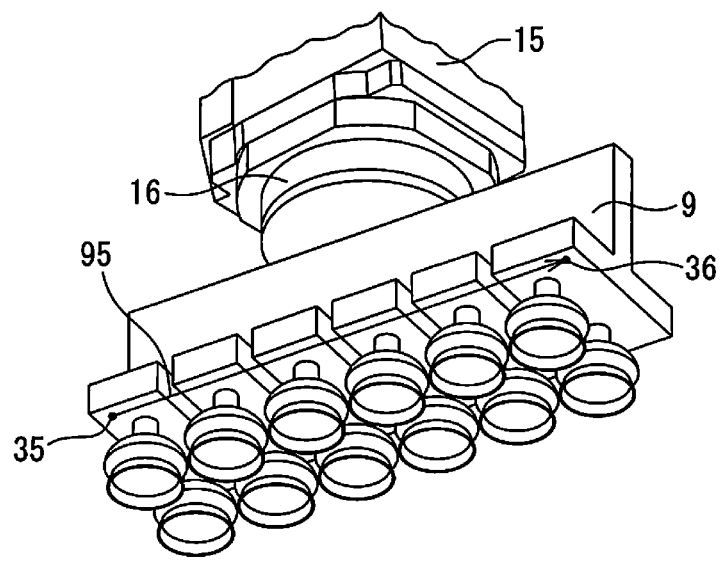
FIG. 17 is a perspective view showing another hand according to the embodiment.

FIG. 17 is a third perspective view that shows the hand for explaining the control for setting the restriction direction of a movement of the hand. The restriction direction of the movement of the hand 9 is a direction connecting the measurement point 35 measured in the first measurement and the measurement point 36 measured in the second measurement. The coordinate setting unit 57 can calculate the restriction direction indicated by arrow 95, based on the positions and postures of the robot 1 when the contact bar 73 is brought into contact with the two measurement points. The restriction direction can be indicated by the coordinate values of two rotation directions of the W axis, the P axis, and the R axis of the flange coordinate system. In other words, the restriction direction can be set by any two of the three coordinate values of the rotation directions of the flange coordinate system. The coordinate setting unit 57 can set the coordinate axes such that the restriction direction indicated by the arrow 95 is parallel to one of the coordinate axes of the tool coordinate system. For example, the coordinate setting unit 57 can set the tool coordinate system such that the restriction direction is the X-axis direction of the tool coordinate system.

Moreover, the operator measures the measurement points on each restriction direction of the operation tool. For example, when the restriction direction is set perpendicular to the X-axis direction, the operator measures two measurement points by bringing the contact bar 73 into contact with the two different points on a surface of a workpiece. The coordinate setting unit 57 can set the restriction direction based on these measurement points. The coordinate setting unit 57 can set the tool coordinate system such that the calculated direction is the Y-axis direction.

Furthermore, as described above, the position of the origin of the tool coordinate system can be optionally set in the monitoring control of the present embodiment. The position of the origin of the tool coordinate system is indicated by the coordinate value of the X axis, the coordinate value of the Y axis, and the coordinate value of the Z axis in the flange coordinate system and any coordinate values can be set. For example, the position of the origin of the tool coordinate system can be set at any position on the operation tool. The coordinate setting unit 57 can write information regarding the created tool coordinate system in the configuration file.

As described above, according to the controller of the present embodiment, the operator specifies multiple measurement points on the operation tool so as to set the restriction direction and set the tool coordinate system based on the restriction direction. In the presence of the restriction direction for a movement of the operation tool, the tool coordinate system for monitoring can be easily set in the configuration file.

In the above-mentioned control, the coordinate axis extending in the restriction direction in which the movement of the operation tool is restricted is set in the configuration file. In other words, the direction that restricts the movement of the operation tool is set in the configuration file, the embodiment is not limited to this. A coordinate axis extending in the permission direction in which the movement of the operation tool is permitted may be set in the configuration file. In this case, the direction of coordinate axis other than the coordinate axis extending in the permission direction corresponds to the restriction direction. As in the above-mentioned control, the control for limiting the speed can be performed on the coordinate axis other than the coordinate axis extending in the permission direction. The determination unit determines whether or not the origin of the tool coordinate system moves in the direction of the coordinate axis other than the coordinate axis extending in the permission direction. If the origin of the tool coordinate system moves in the direction of the coordinate axis other than the coordinate axis extending in the permission direction, the speed limiting unit performs the speed reduction control for reducing the movement speed of the operation tool or the stop control for stopping the robot.

In the foregoing steps of control, the order of steps can be optionally changed without modifying the function and effect.

According to an aspect of the present disclosure, a robot controller can be provided that easily creates a configuration file for monitoring the movement direction of the operation tool.

The above embodiments can be suitably combined. In the above-mentioned figures, the same or corresponding parts are assigned the same reference signs. Note that the above embodiments are illustrative and do not limit the inventions. Further, in the embodiments, changes covered by the claims are intended.

The invention claimed is:

1. A controller for controlling a robot, the robot being an articulated robot including a plurality of joints,
wherein, in the controller, a reference coordinate system of the robot, a flange coordinate system that is transformed from the reference coordinate system with an origin of the flange coordinate system set on a surface of a flange at a tip of the robot where an operation tool is attached, and a tool coordinate system that is transformed from the flange coordinate system are predetermined,
the controller comprising:
a storage unit configured to store a configuration file in which the tool coordinate system is set, the tool coordinate system including a first coordinate axis extending in a permission direction for a movement of the operation tool and a second coordinate axis extending in a restriction direction for restricting the movement of the operation tool,
a direction calculating unit configured to calculate a movement direction of an origin of the tool coordinate system based on the tool coordinate system set in the configuration file and a position and posture of the robot;
a determination unit configured to determine whether the origin of the tool coordinate system moves in a direction of the first coordinate axis extending in the permission direction or in a direction of the second coordinate axis extending in the restriction direction; and
a speed limiting unit configured to limit a motion speed of the robot based on a motion program, wherein the speed limiting unit is further configured to perform a speed reduction control for reducing a movement speed of the operation tool or a stop control for stopping the robot in response to a start of a movement of the origin of the tool coordinate system in the direction of the second coordinate axis extending in the restriction direction, and continue moving the operation tool and controlling the robot in response to a movement of the origin of the tool coordinate system in the direction of the first coordinate axis extending in the permission direction.

2. The controller according to claim 1, wherein the determination unit is further configured to calculate the movement speed of the operation tool and determines whether the movement speed of the operation tool is higher than a predetermined speed judgment value, and the speed limiting unit is further configured to control the movement speed of the operation tool to the speed judgment value or lower in response to the movement speed of the operation tool higher than the speed judgment value.

3. The controller according to claim 1, wherein in response to the movement of the origin of the tool coordinate system in the direction of the second coordinate axis extending in the restriction direction, the speed limiting unit is configured to continue a current motion for a predetermined set time and perform the speed reduction control or the stop control after the set time has elapsed.

4. The controller according to claim 1, further comprising a distance calculating unit configured to calculate a movement distance on the second coordinate axis extending in the restriction direction, based on a position of the origin of the tool coordinate system before the movement of the operation tool is monitored, wherein the determination unit is configured to determine whether the movement distance is within a predetermined distance judgment value in response to the movement of the origin of the tool coordinate system in the direction of the second coordinate axis extending in the restriction direction, and the speed limiting unit is configured to continue the current motion of the robot in response to the movement distance within the distance judgment value, and perform the speed reduction control or the stop control in response to the movement distance exceeding the distance judgment value.

5. The controller according to claim 1, further comprising a coordinate setting unit configured to set the tool coordinate system in the configuration file, wherein the coordinate setting unit is configured to calculate the restriction direction for restricting the movement of the operation tool based on coordinate values of two measurement points on the operation tool, set the direction of the second coordinate axis based on the restriction direction, and set the tool coordinate system based on the direction of the second coordinate axis.

6. The controller according to claim 1, wherein the reference coordinate system is disposed in a part of the robot and fixed when the position and posture of the robot are changed, coordinate axes of the reference coordinate system include an X axis, a Y axis, and a Z axis, which are perpendicular to one another, and coordinate axes of the reference coordinate system further include a W axis set as a coordinate axis around the X axis, a P axis set as a coordinate axis around the Y axis, and an R axis set as a coordinate axis around the Z axis.

7. The controller according to claim 6, wherein the controller is configured to move the flange coordinate system according to a motion of the robot and rotate the flange coordinate system with the surface of the flange during a rotation of the flange, coordinate axes of the flange coordinate system include an X axis, a Y axis, and a Z axis, which are perpendicular to one another, and the flange coordinate system is disposed such that a direction in which a rotation axis of the flange extends coincides with a direction in which the Z axis of the flange coordinate system extends, and the coordinate axes of the flange coordinate system further include a W axis around the X axis of the flange coordinate system, a P axis around the Y axis of the flange coordinate system, and an R axis around the Z axis of the flange coordinate system.

8. The controller according to claim 7, wherein an orientation of the flange coordinate system is set by a coordinate value of a point in the W axis of the reference coordinate system, a coordinate value of a point in the P axis of the reference coordinate system, and a coordinate value of a point in the R axis of the reference coordinate system, and the controller is configured to calculate the flange coordinate system by transforming the reference coordinate system.

9. The controller according to claim 8, wherein the tool coordinate system has an origin at a position on the operation tool of the robot, the controller is configured to move the tool coordinate system with the flange coordinate system when the position and the posture of the robot are changed, coordinate axes of the tool coordinate system include an X axis, a Y axis, and a Z axis, which are perpendicular to one another, and the tool coordinate system is disposed such that a direction in which the Z axis of the tool coordinate system extends is parallel to a direction in which the operation tool extends, and the tool coordinate system further includes a W axis around the X axis of the tool coordinate system, a P axis around the Y axis of the tool coordinate system, and an R axis around the Z axis of the tool coordinate system.

10. The controller according to claim 9, wherein the position of the origin of the tool coordinate system is set by a coordinate value of a point in the X axis of the flange coordinate system, a coordinate value of a point in the Y axis of the flange coordinate flange coordinate system, and a coordinate value of a point in the Z axis of the flange coordinate system, and an orientation of the tool coordinate system is set by a coordinate value of a point in the W axis of the flange coordinate system, a coordinate value of a point in the P axis of the flange coordinate system, and a coordinate value of a point in the R axis of the flange coordinate system.

11. The controller according to claim 1, wherein the speed limiting unit is further configured to, in response to the start of the movement of the origin of the tool coordinate system, (1) reduce the movement speed of the operation tool to a predetermined speed judgement value and (2) continue the movement of the operation tool, until the operation is completed based on the motion program.

12. A controller for controlling a robot, the robot being an articulated robot including a plurality of joints,
wherein, in the controller, a reference coordinate system of the robot, a flange coordinate system that is transformed from the reference coordinate system with an origin of the flange coordinate system set on a surface of a flange at a tip of the robot where an operation tool is attached, and a tool coordinate system that is transformed from the flange coordinate system are predetermined,
the controller comprising:
a storage unit configured to store a configuration file in which the tool coordinate system is set, the tool coordinate system including a coordinate axis extending in a permission direction for permitting a movement of the operation tool;
a direction calculating unit configured to calculate a movement direction of an origin of the tool coordinate system based on the tool coordinate system set in the configuration file and a position and posture of the robot;
a determination unit configured to determine whether the origin of the tool coordinate system moves in a direction of a coordinate axis other than the coordinate axis extending in the permission direction; and
a speed limiting unit configured to limit a motion speed of the robot based on a motion program, wherein
the speed limiting unit is further configured to
perform a speed reduction control for reducing a movement speed of the operation tool or a stop control for stopping the robot in response to a start of a movement of the origin of the tool coordinate system in the direction of the coordinate axis other than the coordinate axis extending in the permission direction, and
continue moving the operation tool and controlling the robot in response to a movement of the origin of the tool coordinate system in the direction of the coordinate axis extending in the permission direction.

13. The controller according to claim 12, wherein the speed limiting unit is further configured to, in response to the start of the movement of the origin of the tool coordinate system, (1) reduce the movement speed of the operation tool to a predetermined speed judgement value and (2) continue the movement of the operation tool, until the operation is completed based on the motion program.

* * * * *